(12) United States Patent
Anderson et al.

(10) Patent No.: US 9,964,042 B2
(45) Date of Patent: May 8, 2018

(54) BRACKET DOUBLER

(71) Applicant: United Technologies Corporation, Hartford, CT (US)

(72) Inventors: Derek W. Anderson, Cromwell, CT (US); Ron I. Prihar, West Hartford, CT (US); William Bogue, Hebron, CT (US)

(73) Assignee: United Technologies Corporation, Farmington, CT (US)

( * ) Notice: Subject to any disclaimer, the term of this patent is extended or adjusted under 35 U.S.C. 154(b) by 202 days.

(21) Appl. No.: 14/527,175

(22) Filed: Oct. 29, 2014

(65) Prior Publication Data

US 2016/0215697 A1 Jul. 28, 2016

Related U.S. Application Data

(60) Provisional application No. 61/896,880, filed on Oct. 29, 2013.

(51) Int. Cl.
| | |
|---|---|
| *F16L 3/08* | (2006.01) |
| *F02C 7/20* | (2006.01) |
| *F16L 57/00* | (2006.01) |
| *F16L 3/223* | (2006.01) |
| *F16L 3/237* | (2006.01) |
| *F02C 7/32* | (2006.01) |
| *F16L 55/035* | (2006.01) |

(52) U.S. Cl.
CPC ................. *F02C 7/20* (2013.01); *F02C 7/32* (2013.01); *F16L 3/223* (2013.01); *F16L 3/237* (2013.01); *F16L 57/00* (2013.01); *F16L 55/035* (2013.01)

(58) Field of Classification Search
CPC ...... F02C 7/20; F02C 7/32; F02C 7/04; F02C 7/05; F16L 3/223; F16L 3/237; F16L 57/00; F16L 55/035
USPC .................................. 248/65, 554, 544, 68.1
See application file for complete search history.

(56) References Cited

U.S. PATENT DOCUMENTS

| | | | |
|---|---|---|---|
| 5,350,279 A | 9/1994 | Prentice et al. | |
| 5,378,026 A | 1/1995 | Ninacs et al. | |
| 6,951,324 B2* | 10/2005 | Karamanos | F24D 19/02 248/300 |
| 6,964,451 B1 | 11/2005 | Bergey | |
| 7,389,860 B2 | 6/2008 | Abu-Odeh et al. | |
| 7,581,399 B2 | 9/2009 | Farah et al. | |
| 7,708,224 B2* | 5/2010 | Aho-Mantila | B64D 27/18 244/123.1 |
| 7,861,535 B2 | 1/2011 | Figueroa et al. | |
| 7,900,872 B2 | 3/2011 | Sternberger | |

(Continued)

*Primary Examiner* — Christopher Garft
(74) *Attorney, Agent, or Firm* — O'Shea Getz P.C.

(57) ABSTRACT

A bracket assembly for a gas turbine engine includes a bracket base with a separation between a first bended feature and a second bended feature. A doubler is mechanically fastened adjacent to the separation. Another bracket assembly for a gas turbine engine includes a bracket base with a separation between a first bended feature and a second bended feature. A cushioned tube support is welded to the bracket base. A doubler is mechanically fastened adjacent to the separation. A method of assembling a bracket assembly for a gas turbine engine includes mechanically fastening a doubler to a bracket base adjacent to a separation between a first bended feature and a second bended feature.

12 Claims, 11 Drawing Sheets

(56) References Cited

U.S. PATENT DOCUMENTS

| | | |
|---|---|---|
| 8,015,820 B2 | 9/2011 | Harris et al. |
| 8,104,736 B2 | 1/2012 | Callaghan |
| 2002/0079630 A1 | 6/2002 | Bachmeyer et al. |
| 2005/0236241 A1 | 10/2005 | Dusserre-Telmon et al. |

* cited by examiner

BRACKET DOUBLER

CROSS-REFERENCE TO RELATED APPLICATION

This application claims priority to U.S. Provisional Patent Application No. 61/896,880 filed Oct. 29, 2013, which is hereby incorporated herein by reference in its entirety.

BACKGROUND

The present disclosure relates to a bracket assembly and, more particularly, to a bracket assembly for a gas turbine engine.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Brackets retain various components of the gas turbine engine. In normal service operations, brackets may experience cracking due to operational loading imparted by thermal gradients, deflections, or other mechanical forces. The cracks often occur in areas of high stress levels, driven by sharp geometric changes that concentrate stress. Most often, such brackets are removed from service because traditional repair methods such as welding may not result in parts that meet all airworthiness standards or for cost concerns.

SUMMARY

A bracket assembly for a gas turbine engine, according to one disclosed non-limiting embodiment of the present disclosure, includes a bracket base with a separation between a first bended feature and a second bended feature. A doubler is mechanically fastened adjacent to the separation.

In a further embodiment of the present disclosure, the doubler is a flat plate.

In a further embodiment of any of the foregoing embodiments of the present disclosure, the doubler is "L" shaped.

In a further embodiment of any of the foregoing embodiments of the present disclosure, the doubler is "U" shaped.

In a further embodiment of any of the foregoing embodiments of the present disclosure, the doubler bridges the separation.

In a further embodiment of any of the foregoing embodiments of the present disclosure, the doubler includes a doubler separation adjacent to the separation.

In a further embodiment of any of the foregoing embodiments of the present disclosure, the first bended feature and the second bended feature are directed in generally opposite directions on either side of the separation.

In a further embodiment of any of the foregoing embodiments of the present disclosure, the first bended feature and the second bended feature each include at least one fastener aperture.

In a further embodiment of any of the foregoing embodiments of the present disclosure, a cushioned tube support is welded to the bracket base.

In a further embodiment of any of the foregoing embodiments of the present disclosure, the doubler is mechanically fastened to the bracket base and the cushioned tube support.

In a further embodiment of any of the foregoing embodiments of the present disclosure, the doubler is mechanically fastened to the bracket brace.

A bracket assembly for a gas turbine engine, according to another disclosed non-limiting embodiment of the present disclosure, includes a bracket base with a separation between a first bended feature and a second bended feature. A cushioned tube support is welded to the bracket base. A doubler mechanically is fastened adjacent to the separation.

In a further embodiment of any of the foregoing embodiments of the present disclosure, the doubler is riveted to the bracket brace.

In a further embodiment of any of the foregoing embodiments of the present disclosure, the doubler is riveted to the bracket brace and the cushioned tube support.

In a further embodiment of any of the foregoing embodiments of the present disclosure, the first bended feature and the second bended feature are directed in generally opposite directions.

In a further embodiment of any of the foregoing embodiments of the present disclosure, the first bended feature and the second bended feature each include at least one fastener aperture.

A method of assembling a bracket assembly for a gas turbine engine, according to another disclosed non-limiting embodiment of the present disclosure, includes mechanically fastening a doubler to a bracket base adjacent to a separation between a first bended feature and a second bended feature.

In a further embodiment of any of the foregoing embodiments of the present disclosure, the method includes bending the first bended feature and the second bended feature in opposite directions prior to mechanically fastening the doubler.

In a further embodiment of any of the foregoing embodiments of the present disclosure, the method includes welding a cushioned tube support to the bracket base prior to the bending.

In a further embodiment of any of the foregoing embodiments of the present disclosure, the method includes mechanically fastening the doubler to the bracket base and the cushioned tube support.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
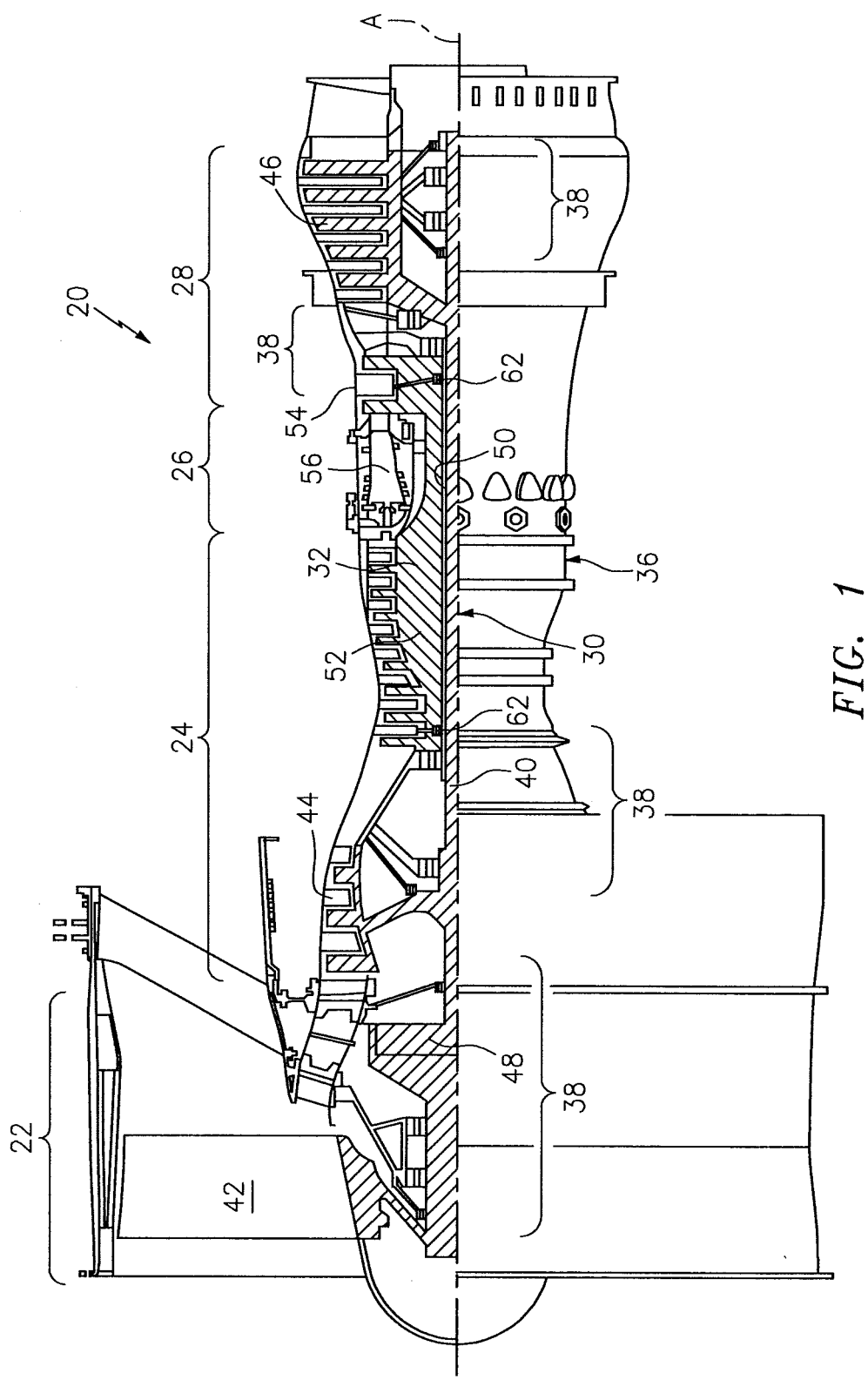
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath and into the compressor section 24 to drive core air along a core flowpath. The core air is compressed then communicated into the combustor section 26 for downstream expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, three-spool (plus fan) turbofans with an intermediate spool and geared architecture gas turbine engines such as an epicyclic transmission, namely a planetary or star gear system.

The example engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 as shown in FIG. 1 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 46, 54 rotationally drive the respective low spool 30 and high spool 32 in response to the expansion. The main engine shafts 40, 50 are supported at a plurality of points by the bearing structures 38 within the static structure 36. It should be understood that various bearing structures 38 at various locations may alternatively or additionally be provided.

In one non-limiting example, the gas turbine engine 20 is a high-bypass geared aircraft engine. By further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one example engine architecture, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust. Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 2:
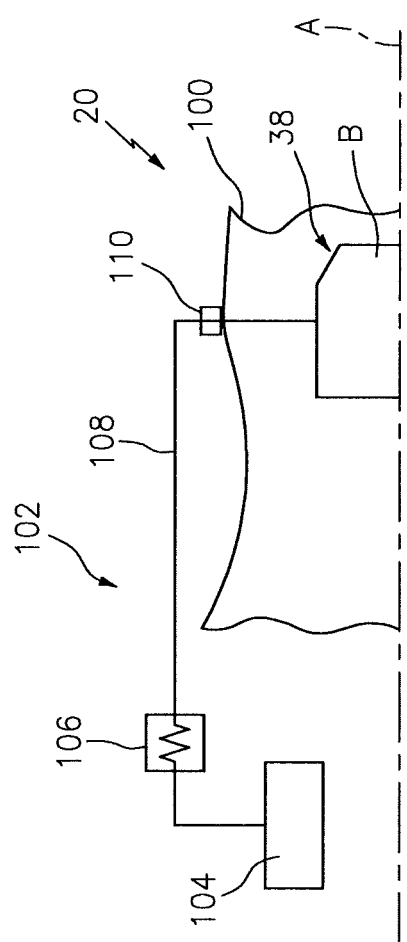
FIG. 2 is a schematic view of a section of the example gas turbine engine with a bracket assembly.

With reference to FIG. 2, a section 100 of a gas turbine engine, such as the gas turbine engine 20, includes one or more of the bearing structures 38. Although only one bearing structure 38 is depicted to schematically illustrate its features this is in no way intended to limit this disclosure.

The bearing structure 38 includes a bearing compartment B that contains a lubricant for lubrication and as a coolant. The bearing compartment B is pressurized to prevent the lubricant from leaking out during certain flight conditions, including both steady-state and transient. A buffer system 102 communicates a buffer supply air to the bearing compartment B to facilitate such pressurization. Example buffer systems that can be used for this and other purposes, including spinner anti-icing, and others.

The buffer system 102 may include a first bleed air supply 104 and a conditioning device 106. The first bleed air supply 104 can be sourced from the fan section 22, the low pressure compressor 44 or the high pressure compressor 52. The conditioning device 106 can condition the first bleed air supply 104 to render a buffer supply air of an acceptable temperature for buffering the desired environments. The conditioning device 106 could include an air-to-air heat exchanger, a fuel-to-air heat exchanger, or any other suitable heater exchanger. Although shown schematically, the buffer supply air can be communicated via buffer tubes 108, conduits, or other passageways. Such tubes, conduits and/or passageway are routed throughout the gas turbine engine 20 and may be retained by a bracket assembly 110. The type, location and configuration of such tubing, conduits and/or passageways are not intended to limit this disclosure.

Figure 3:
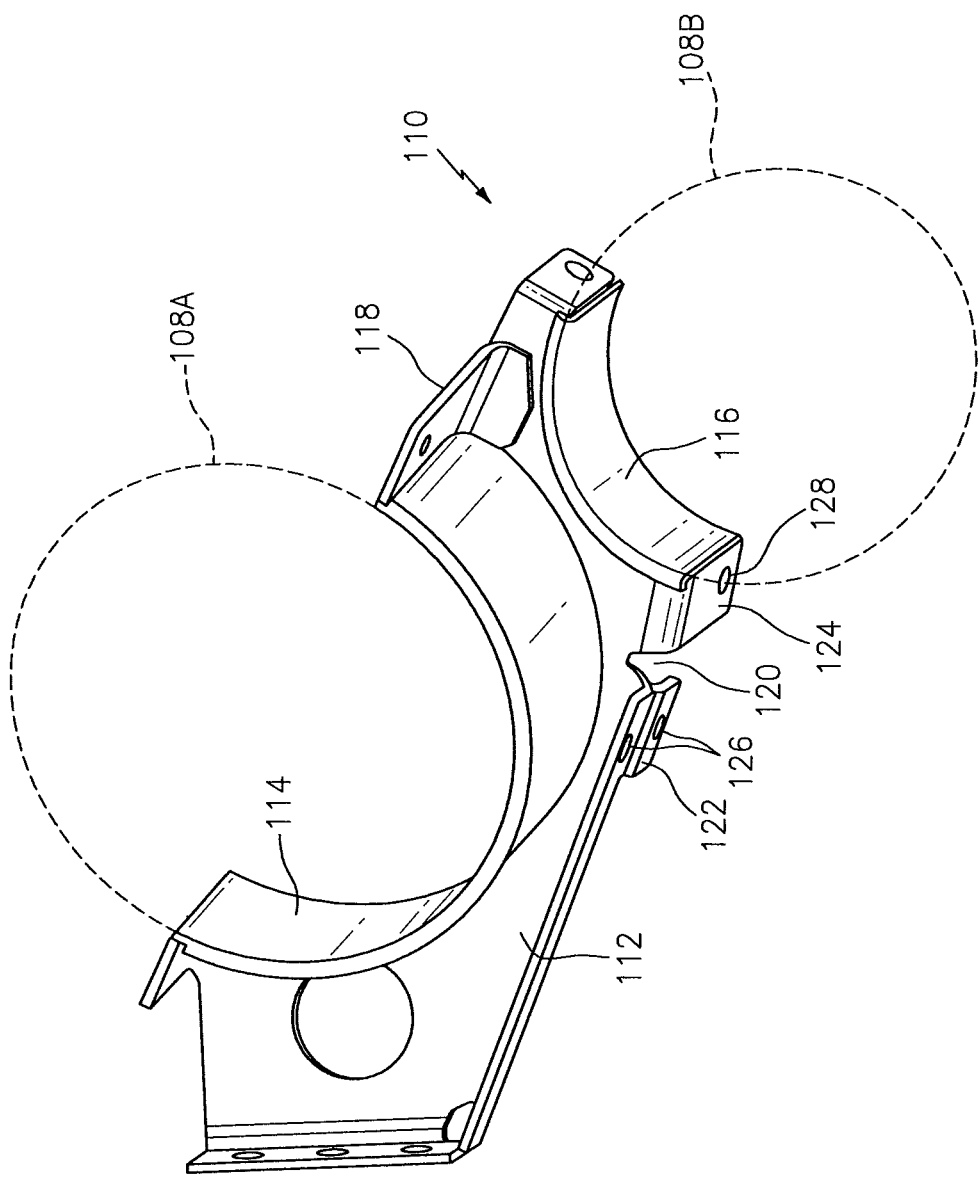
FIG. 3 is a perspective view of a bracket assembly with a doubler according to one disclosed non-liming embodiment.

With reference to FIG. 3, the bracket assembly 110 in this example supports two (2) buffer tubes 108A, 108B (shown schematically). As defined herein a "bracket" includes various supports, struts, props, stays, braces to support buffer tubes and other components not limited to buffer tubes. The bracket assembly 110 in the disclosed non-limiting embodiment is manufactured of a titanium alloy and includes multiple details such as a bracket base 112, a first cushioned tube support 114, a second cushioned tube support 116, a bracket detail 118 and a separation 120 between a first bended feature 122 and a second bended feature 124. It should be appreciated that in this disclosed non-limiting embodiment, "cushioned" includes a rubber, fabric, or other material that may be damaged by a weld, braze or stress relief process, however, other non-cushioned materials may also be utilized.

Although the first bended feature 122 and the second bended feature 124 are disclosed herein as attachments with respective fastener apertures 126, 128 it should be appreciated that other details and features which also require the separation 120 to permit a proper bend geometry will also benefit herefrom. The separation 120 may alternatively or additionally be utilized where a feature may stretch the sheet metal and the separations allow more extensive forming such that a curved L-Shaped surface; or where two legs bent out of the original flat pattern plane would otherwise occupy the same space in that flat pattern.

Figure 4:
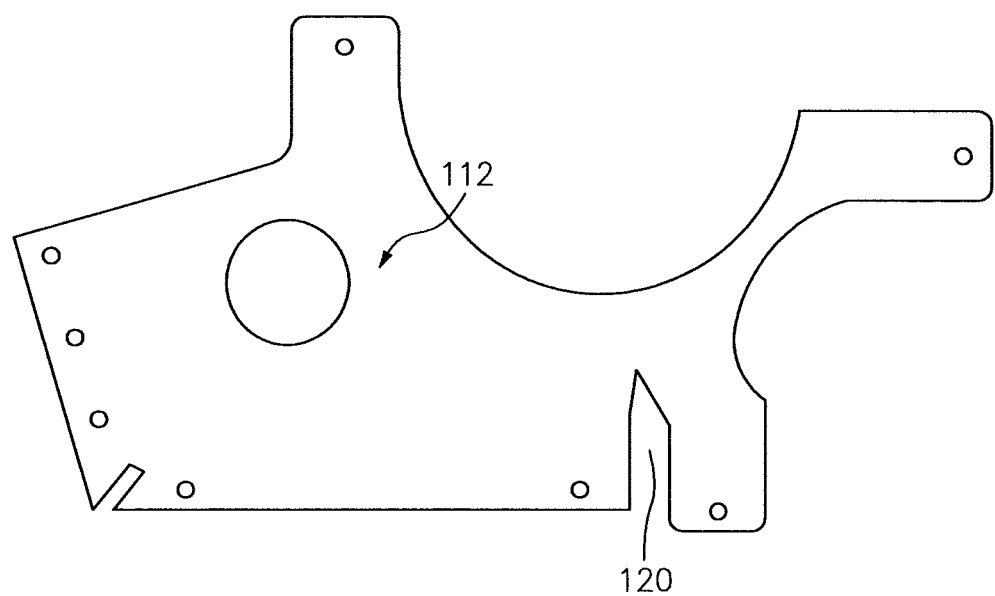
FIG. 4 is a perspective view of a bracket base of the bracket assembly prior to a bending operation.
Figure 5:
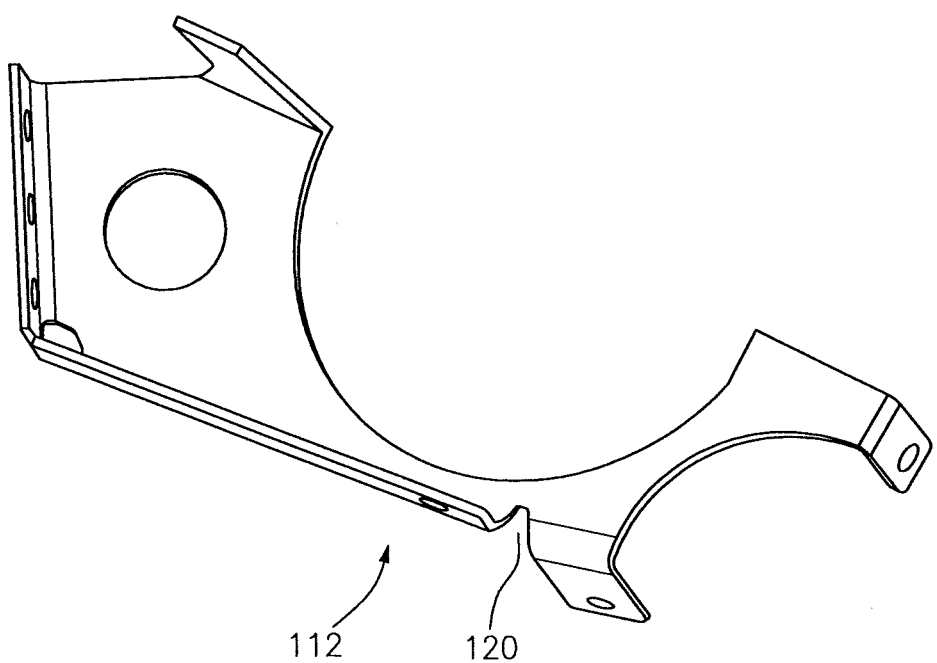
FIG. 5 is a perspective view of a bracket base of the bracket assembly subsequent to the bending operation.

The bracket base 112 in this disclosed non-limiting embodiment is an about 0.125 inches (3.175 mm) thick flat plate (see FIG. 4) that is formed into its final geometry via, for example, bending (see FIG. 5). The economic aspects of fabrication favor making a bracket from a flat pattern (2D) and bending the features into the 3rd dimension to reduce the extent of machining and structural impacts of machining the component from unitary stock. After bending to it final geometry the additional details such as the first cushioned tube support 114, the second cushioned tube support 116 and the bracket feature detail 118 are welded thereto.

Figure 6:
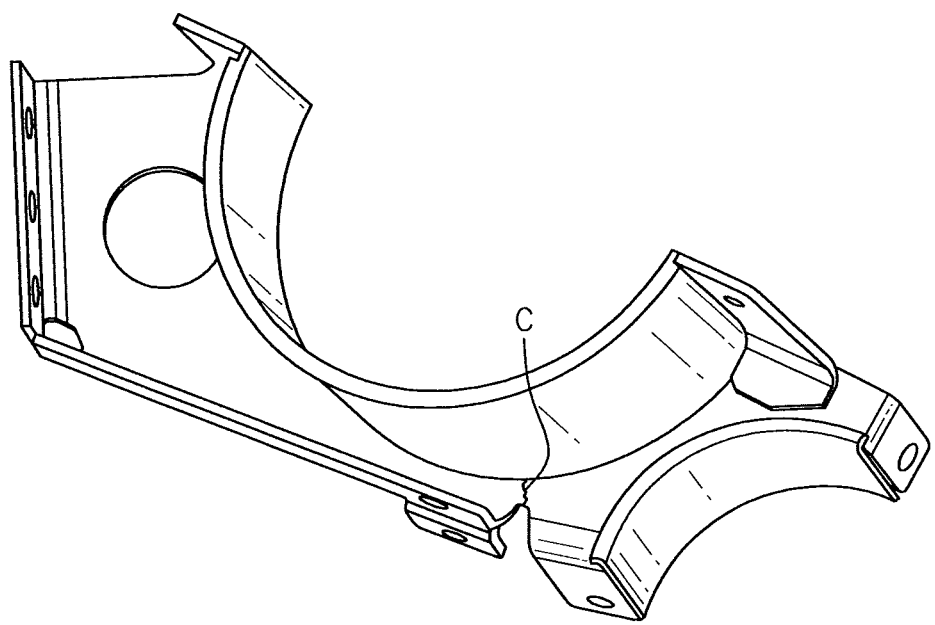
FIG. 6 is a perspective view of a bracket assembly with an example stress crack.

The first bended feature 122 and the second bended feature 124 in this disclosed non-limiting embodiment are forming in generally opposite directions which requires the separation 120 therebetween to facilitate the desired bend radiuses. The separation 120 extends generally inward into the bracket base 112 and may be of a slot, keyhole, or other geometry between the first bended feature 122 and the second bended feature 124. The separation 120, although operable to facilitate the bends, inherently forms a stress riser in the bracket base 112 which may result in the development of a crack C (illustrated schematically in FIG. 6) in service. That is, the sharp geometric changes may concentrate stresses in the separation 120.

Figure 7:
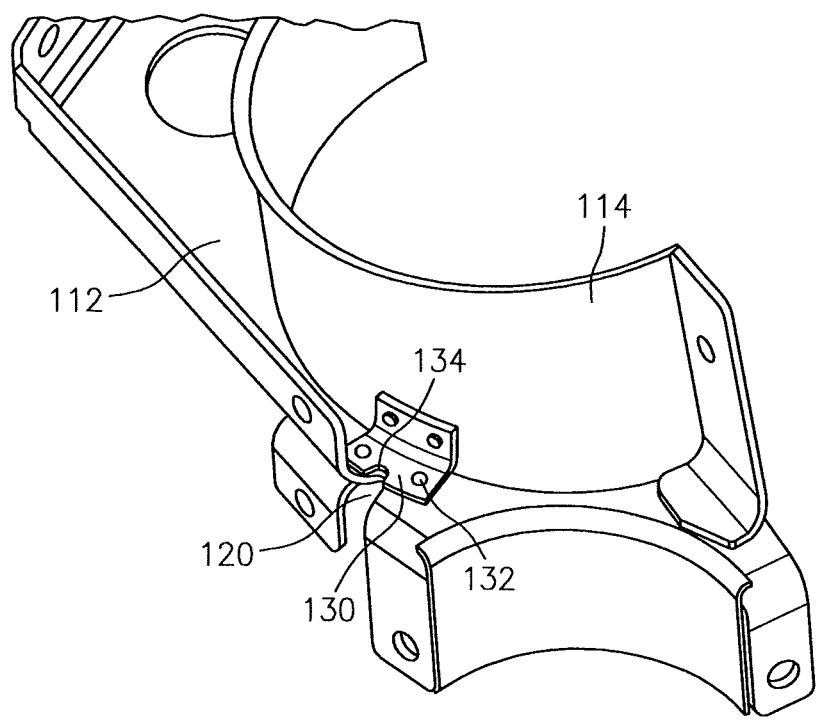
FIG. 7 is a perspective view of a bracket assembly with a doubler according to another disclosed non-liming embodiment.

With reference to FIG. 7, a doubler 130 is located adjacent to the separation 120. The doubler 130 is attached to the bracket base 112 with mechanical fasteners 132 to include but not be limited to rivets, screws, bolts, or others. The doubler 130 may be attached during original equipment manufacture, or alternatively, may be utilized as a repair should the crack C (illustrated schematically in FIG. 6) develop in service as a weld repair approach would otherwise requires additional disassembly of features that cannot endure the post-weld stress relief or that the stress relief process itself may result in additional debits from distortion or surface contamination.

The doubler 130 thereby eliminates the potential for development of the crack formed during original manufacture or readily caries the mechanical load during repair. It should be appreciated that the doubler 130 and fasteners 132 may be readily provided as a "kit" to provide service repair in the field.

Figure 8:
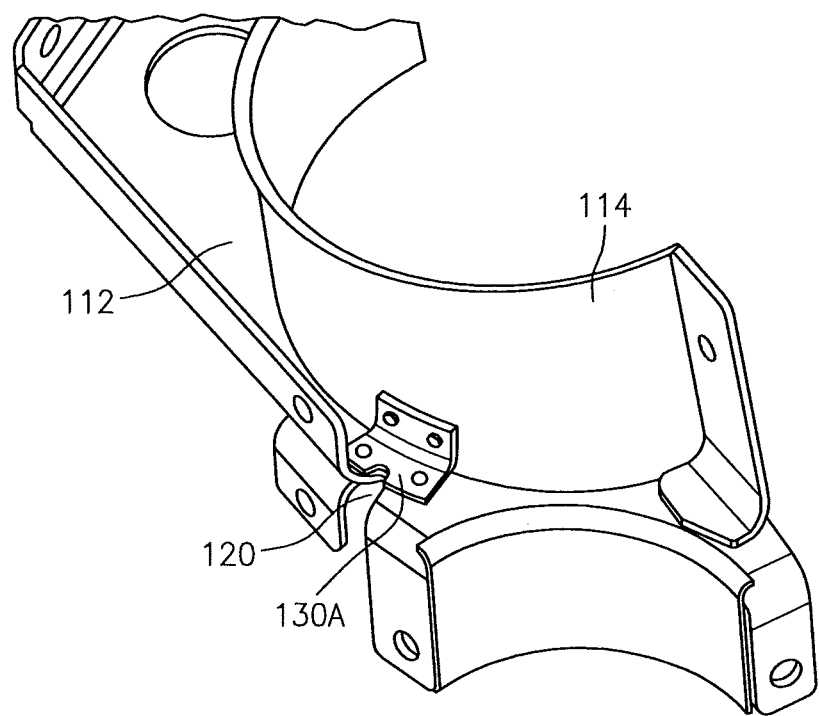
FIG. 8 is a perspective view of a bracket assembly with a doubler according to another disclosed non-liming embodiment.

In one disclosed non-limiting embodiment, the doubler 130 may include a doubler separation 134 such as a slot, keyhole, or other geometry which is positioned adjacent the separation 120 to minimize stress concentration transfer from the bracket base 112 into the doubler 130. In another disclosed non-limiting embodiment (see FIG. 8), the doubler 130A may be of a solid structure that bridges the separation 120.

Figure 9:
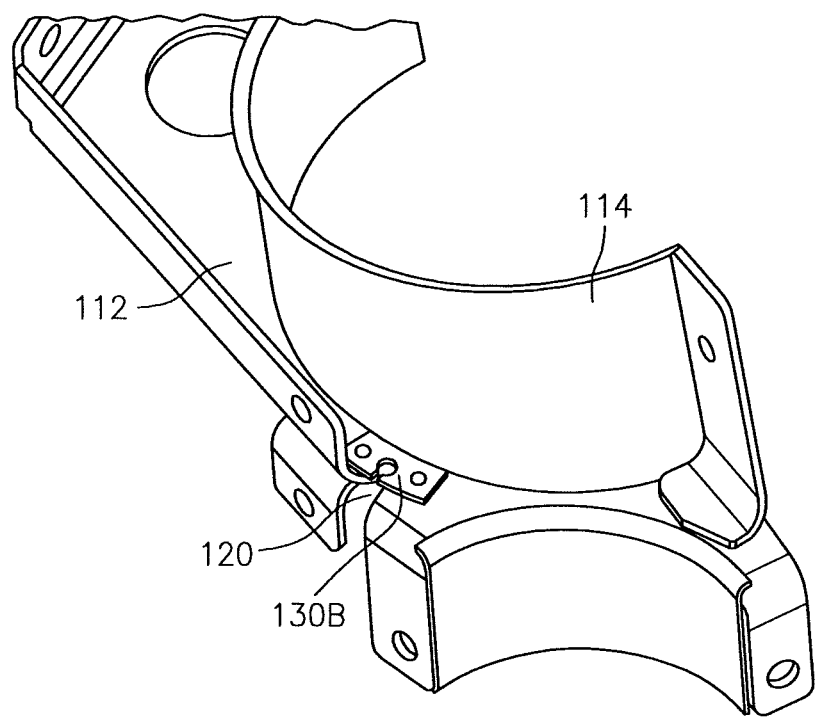
FIG. 9 is a perspective view of a bracket assembly with a doubler according to another disclosed non-liming embodiment.
Figure 10:
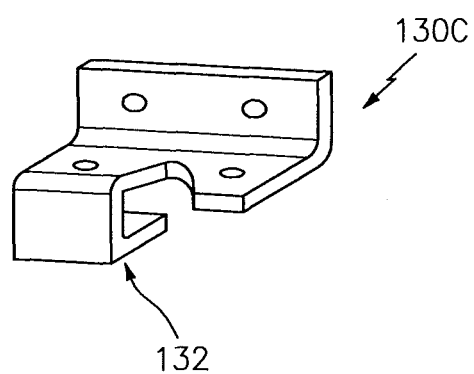
FIG. 10 is a perspective view of a bracket assembly with a doubler according to still another disclosed non-liming embodiment.

In this disclosed non-limiting embodiment, the doubler 130 may be of a generally "L" shape attached to both the bracket base 112 and the first cushioned tube support 114. In another disclosed non-limiting embodiment, the doubler 130B may be but a flat plate attached to the bracket base 112 (see FIG. 9). In still another disclosed non-limiting embodiment, the doubler 130C may include a generally "U" shape feature 132 to at least partially wrap around the bracket base 112 (see FIG. 10). It should be appreciated that other geometries may alternatively be provided.

Figure 11:
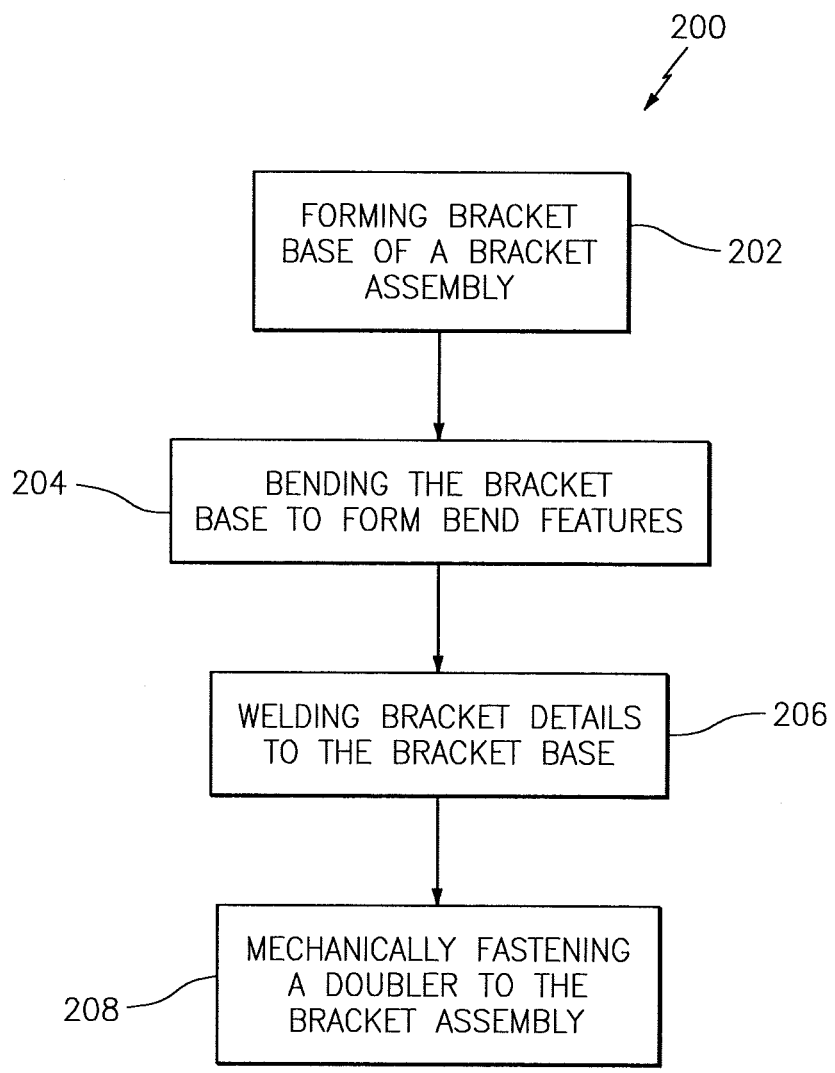
FIG. 11 is a flow chart illustrating assembly of a bracket assembly with a double according to one disclosed non-liming embodiment.

With reference to FIG. 11, a flow chart illustrates one disclosed non-limiting embodiment of a method 200 for fabricating the bracket assembly 110 initially includes forming the bracket base 112 (step 202). Next, the bracket base 112 is bent to form the bended features 122, 124 (step 204). After being bent into its final geometry, additional details such as the first cushioned tube support 114, the second cushioned tube support 116 and the bracket feature detail 118 are welded thereto (step 206). Finally, the doubler 130 is mechanically fastened to the bracket base 112 such as by rivets (step 208).

The doubler is relatively inexpensive, is readily installed and avoids the structural durability debits of a weld repair—which may not even be feasible due to alpha case issues with materials such as titanium.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An assembly for a gas turbine engine, comprising:
   a bracket base with a separation between a first bended feature and a second bended feature;
   a doubler fastened adjacent to the separation;
   a cushioned tube support welded to the bracket base; and
   a buffer tube supported by the cushioned tube support,
   wherein the doubler is "L" shaped, and
   wherein the doubler is fastened to the bracket base and the cushioned tube support.

2. The assembly as recited in claim 1, wherein the doubler bridges the separation.

3. The assembly as recited in claim 1, wherein the doubler includes a doubler separation adjacent to the separation.

4. The assembly as recited in claim 1, wherein the first bended feature and the second bended feature are directed in generally opposite directions on either side of the separation.

5. The assembly as recited in claim 4, wherein the first bended feature and the second bended feature each include at least one fastener aperture.

6. An assembly for a gas turbine engine, comprising:
   a bracket base with a separation between a first bended feature and a second bended feature, the bracket base including a crack in proximity to the separation;
   a cushioned tube support welded to the bracket base; and
   a doubler fastened adjacent to the separation,
   wherein the doubler is "L" shaped,
   wherein the doubler is fastened to the bracket base and the cushioned tube support, and
   wherein the crack is a result of a stress riser formed in the bracket base due to the separation.

7. The assembly as recited in claim 6, wherein the doubler is riveted to the bracket base.

8. The assembly as recited in claim 6, wherein the doubler is riveted to the bracket base and the cushioned tube support.

9. The assembly as recited in claim 6, wherein the first bended feature and the second bended feature are directed in generally opposite directions.

10. The assembly as recited in claim 9, wherein the first bended feature and the second bended feature each include at least one fastener aperture.

11. The assembly as recited in claim 1, further comprising:
    a second cushioned tube support welded to the bracket base; and
    a second buffer tube supported by the second cushioned tube support.

12. The assembly as recited in claim 1, wherein the doubler is mechanically fastened adjacent to the separation, and wherein the doubler is mechanically fastened to the bracket base and the cushioned tube support.

* * * * *